US011739697B2

(12) United States Patent
Ortiz et al.

(10) Patent No.: US 11,739,697 B2
(45) Date of Patent: Aug. 29, 2023

(54) BLEED FLOW SAFETY SYSTEM (71) Applicant: United Technologies Corporation, Farmington, CT (US)

(72) Inventors: Jonathan Ortiz, Torrance, CA (US); Matthew P. Forcier, South Windsor, CT (US); William K. Ackermann, East Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 173 days.

(21) Appl. No.: 15/601,524

(22) Filed: May 22, 2017

(65) Prior Publication Data
US 2018/0334965 A1    Nov. 22, 2018

(51) Int. Cl.
| *F02C 9/18* | (2006.01) |
| *F01D 9/06* | (2006.01) |
| *F02C 7/18* | (2006.01) |
| *F01D 17/02* | (2006.01) |

(52) U.S. Cl.
CPC ............... *F02C 9/18* (2013.01); *F01D 9/065* (2013.01); *F01D 17/02* (2013.01); *F02C 7/18* (2013.01); *F05D 2220/32* (2013.01); *F05D 2260/20* (2013.01); *F05D 2270/30* (2013.01)

(58) Field of Classification Search
None
See application file for complete search history.

(56) References Cited

U.S. PATENT DOCUMENTS

| 6,487,863 | B1 * | 12/2002 | Chen ..................... F02C 6/08 60/39.12 |
| 6,615,574 | B1 | 9/2003 | Marks |
| 6,910,851 | B2 | 6/2005 | Franconi et al. |
| 6,931,859 | B2 | 8/2005 | Morgan et al. |
| 6,981,841 | B2 | 1/2006 | Krammer et al. |
| 8,057,157 | B2 | 11/2011 | Roush et al. |
| 8,240,153 | B2 | 8/2012 | Childers et al. |
| 8,397,487 | B2 | 3/2013 | Sennoun et al. |

(Continued)

FOREIGN PATENT DOCUMENTS

| EP | 2119892 A2 | 11/2009 |
| EP | 2439390 A1 | 4/2012 |

OTHER PUBLICATIONS

European Search Report Issued In EP Application No. 18173664.6, dated Oct. 2, 2018, 8 Pages.

*Primary Examiner* — Todd E Manahan
*Assistant Examiner* — Rodolphe Andre Chabreyrie
(74) *Attorney, Agent, or Firm* — Cantor Colburn LLP (57) ABSTRACT

A bleed air cooling system for a gas turbine engine includes one or more bleed ports located at one or more axial locations of the gas turbine engine to divert a bleed airflow from a gas turbine engine flowpath, a bleed outlet located at a cooling location of the gas turbine engine and a bleed duct in fluid communication with the bleed port and the configured to convey the bleed airflow from the bleed port to the bleed outlet. One or more safety sensors are configured to sense operational characteristics of the gas turbine engine, and a controller is operably connected to the one or more safety sensors and configured to evaluate the sensed operational characteristics for anomalies in operation of the bleed air cooling system.

10 Claims, 5 Drawing Sheets

(56) References Cited

U.S. PATENT DOCUMENTS

| | | |
|---|---|---|
| 8,843,253 B1 | 9/2014 | Chapman |
| 8,967,528 B2 | 3/2015 | Mackin et al. |
| 9,062,604 B2 | 6/2015 | Defrancesco |
| 9,097,138 B2 | 8/2015 | Glahn et al. |
| 9,128,005 B2* | 9/2015 | Snider ................ G01L 23/24 |
| 9,234,707 B2 | 1/2016 | Mackin et al. |
| 9,261,022 B2 | 2/2016 | Saha et al. |
| 9,482,236 B2 | 11/2016 | Khalid et al. |
| 2010/0011779 A1* | 1/2010 | Senior .................. F01D 17/105 |
| | | 60/785 |
| 2011/0072827 A1* | 3/2011 | Ciofini .................. F01D 5/082 |
| | | 60/772 |
| 2012/0102968 A1* | 5/2012 | Fuchs ..................... F02C 9/28 |
| | | 60/773 |
| 2012/0111020 A1* | 5/2012 | Bozzi ..................... F02C 7/18 |
| | | 60/782 |
| 2012/0117977 A1* | 5/2012 | Childers ................. F02C 7/18 |
| | | 60/782 |
| 2012/0216545 A1* | 8/2012 | Sennoun ................ B64D 13/06 |
| | | 60/772 |
| 2013/0170966 A1* | 7/2013 | Cook ..................... F01D 5/081 |
| | | 415/180 |
| 2013/0192238 A1 | 8/2013 | Munsell et al. |
| 2013/0192251 A1 | 8/2013 | Munsell et al. |
| 2015/0027129 A1* | 1/2015 | Franitza ................. F02C 7/185 |
| | | 60/785 |
| 2015/0104289 A1 | 4/2015 | Mackin et al. |
| 2015/0107261 A1 | 4/2015 | Moes et al. |
| 2015/0233291 A1 | 8/2015 | Pelagatti et al. |
| 2015/0233292 A1 | 8/2015 | Pelagatti et al. |
| 2015/0247463 A1 | 9/2015 | Defrancesco |
| 2015/0275758 A1* | 10/2015 | Foutch ................... F02C 7/047 |
| | | 60/785 |
| 2015/0361890 A1* | 12/2015 | Suciu ..................... F02C 9/18 |
| | | 60/785 |
| 2017/0254216 A1* | 9/2017 | Adibhatla ............... F02C 6/08 |
| 2017/0268520 A1* | 9/2017 | Moeckel ................. F02C 9/20 |
| 2017/0268535 A1* | 9/2017 | Mondal ................. F04D 29/642 |

* cited by examiner

BLEED FLOW SAFETY SYSTEM

BACKGROUND

Exemplary embodiments pertain to the art of gas turbine engines. More particularly, the present disclosure relates to cooling of components of the gas turbine engine via bleed air flow.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

In a gas turbine engine, cooling air is often provided from the compressor to the turbine section to reduce component temperature in the turbine section and improve overall gas turbine engine operation. In some gas turbine engines, air from the high compressor discharge is passed through a heat exchanger, which may be located in a fan bypass duct and then delivered into the turbine section as cooling air. The air from the downstream most end of the compressor section is at elevated temperatures, relative to air at other portions of the compressor section.

Running the operating temperatures in the turbine section at high temperatures provides efficiency gains in the gas turbine engine; however, the high temperatures are exceeding material limits and are driving the need for improved cooling air. That is, conventional cooling air methods often require large amounts of airflow to provide cooling air at sufficient pressure to be introduced to the highest pressure places of the gas turbine engine and at cool enough temperature to reduce key component temperatures.

BRIEF DESCRIPTION

In one embodiment, a bleed air cooling system for a gas turbine engine includes one or more bleed ports located at one or more axial locations of the gas turbine engine to divert a bleed airflow from a gas turbine engine flowpath, a bleed outlet located at a cooling location of the gas turbine engine and a bleed duct in fluid communication with the bleed port and the configured to convey the bleed airflow from the bleed port to the bleed outlet. One or more safety sensors are configured to sense operational characteristics of the gas turbine engine, and a controller is operably connected to the one or more safety sensors and configured to evaluate the sensed operational characteristics for anomalies in operation of the bleed air cooling system.

Additionally or alternatively, in this or other embodiments the controller is configured to modify operation of the bleed air cooling system in response to detection of an anomaly.

Additionally or alternatively, in this or other embodiments the controller is configured to selectably change a source of the bleed airflow upon detection of an anomaly.

Additionally or alternatively, in this or other embodiments the controller is configured to selectably modulate a bleed airflow through the bleed air cooling system.

Additionally or alternatively, in this or other embodiments the one or more safety sensors includes one or more of a pressure safety sensor and a temperature safety sensor.

Additionally or alternatively, in this or other embodiments the one or more safety sensors are disposed at a turbine manifold of the gas turbine engine.

Additionally or alternatively, in this or other embodiments the cooling location is one or more components of a turbine section of the gas turbine engine.

Additionally or alternatively, in this or other embodiments the cooling location is a turbine airfoil of the gas turbine engine.

Additionally or alternatively, in this or other embodiments the controller is a full authority digital engine control.

In another embodiment, a gas turbine engine includes a compressor section, a turbine section operably connected to the compressor section, and a bleed air cooling system including one or more bleed ports located at one or more axial locations of the gas turbine engine to divert a bleed airflow from a gas turbine engine flowpath, a bleed outlet located at a cooling location of the gas turbine engine and a bleed duct in fluid communication with the bleed port and the configured to convey the bleed airflow from the bleed port to the bleed outlet. One or more safety sensors are configured to sense operational characteristics of the gas turbine engine, and a controller is operably connected to the one or more safety sensors and configured to evaluate the sensed operational characteristics for anomalies in operation of the bleed air cooling system.

Additionally or alternatively, in this or other embodiments the controller is configured to modify operation of the bleed air cooling system in response to detection of an anomaly.

Additionally or alternatively, in this or other embodiments the controller is configured to selectably change a source of the bleed airflow upon detection of an anomaly.

Additionally or alternatively, in this or other embodiments the controller is configured to selectably modulate a bleed airflow through the bleed air cooling system.

Additionally or alternatively, in this or other embodiments the one or more safety sensors includes one or more of a pressure safety sensor and a temperature safety sensor.

Additionally or alternatively, in this or other embodiments the one or more safety sensors are located at a turbine manifold of the gas turbine engine.

Additionally or alternatively, in this or other embodiments the cooling location is a turbine airfoil of the gas turbine engine.

Additionally or alternatively, in this or other embodiments the controller is a full authority digital engine control.

In yet another embodiment, a method of operating a gas turbine engine includes conveying a bleed airflow from a bleed port of the gas turbine engine toward a cooling location of the gas turbine engine to provide cooling thereto, monitoring the bleed airflow for anomalies via one or more safety sensors located along a bleed airflow pathway, and selectably modifying the bleed airflow in response to detection of an anomaly.

Additionally or alternatively, in this or other embodiments a source of the bleed airflow is selectably changed upon detection of an anomaly.

Additionally or alternatively, in this or other embodiments a bleed airflow through the bleed air cooling system is modulated.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
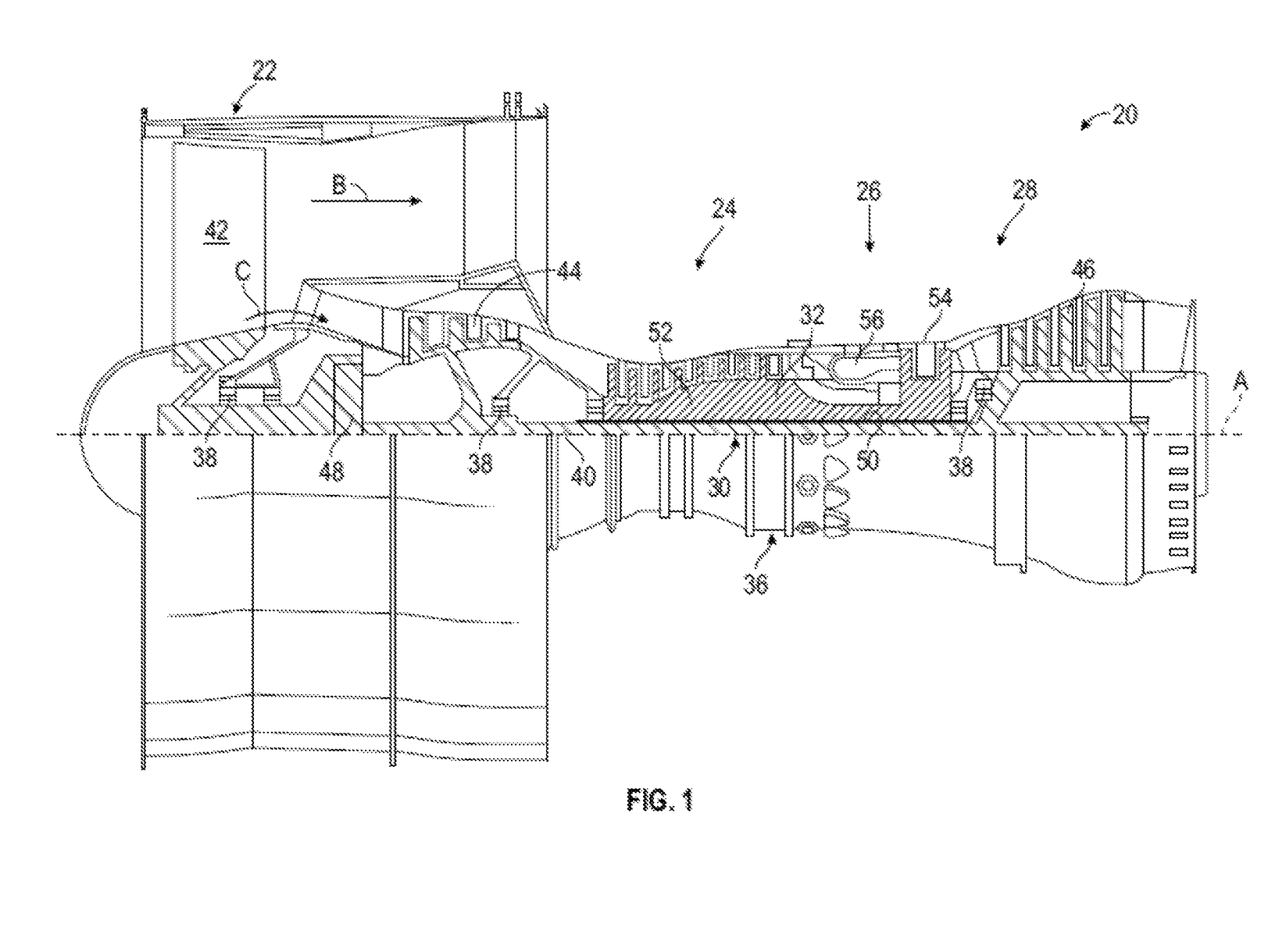
FIG. 1 is cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

Figure 2:
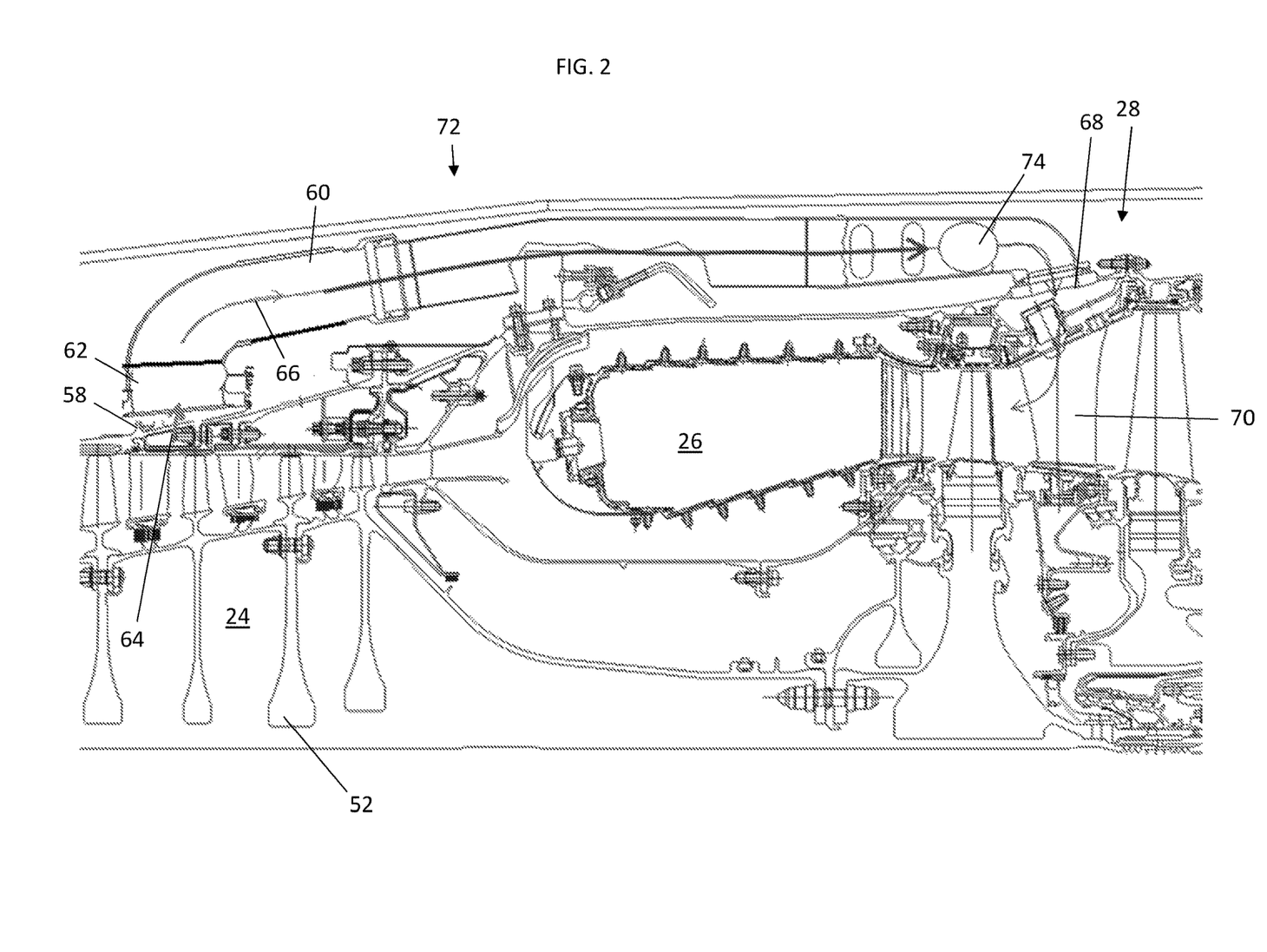
FIG. 2 is a schematic view of an embodiment of a bleed system for a gas turbine engine.
Figure 3:
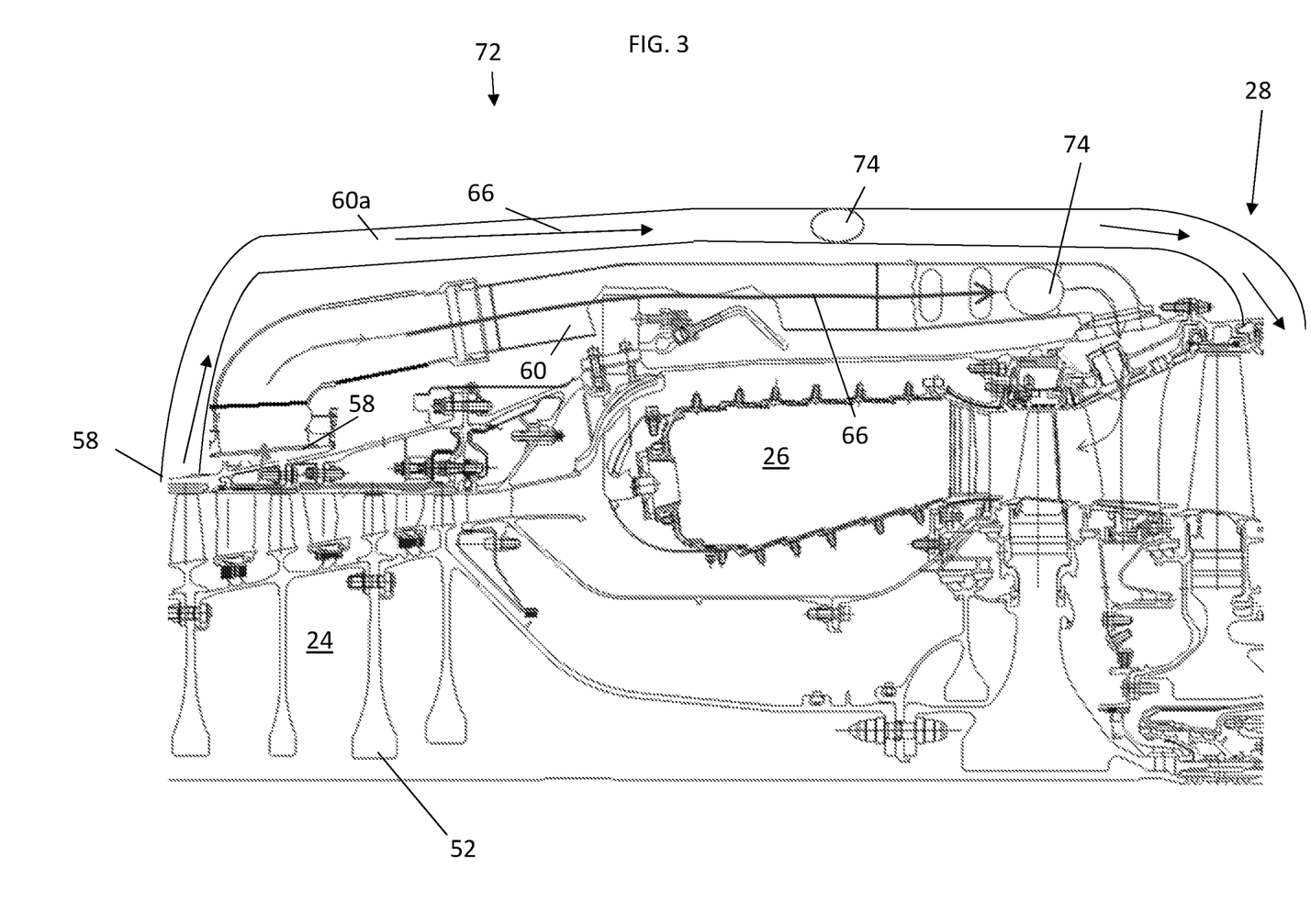
FIG. 3 is a schematic of another embodiment of a bleed system for a gas turbine engine.

Referring now to FIG. 2, illustrated is an embodiment of a bleed air cooling system 72 for the gas turbine engine 10. In this embodiment, the compressor section 24 includes a bleed port 58 connected to a bleed duct 60 via bleed manifold 62. In some embodiments, the bleed port 58 is located at the high pressure compressor 52 to divert high pressure compressor airflow 64 from the high pressure compressor 52 into the bleed duct 60 as bleed airflow 66. The bleed airflow 66 is directed downstream along the bleed duct 60 to one or more locations of, for example, the turbine section 28 to provide cooling for one or more components thereat. In the embodiment of FIG. 2, a turbine manifold 68 is connected to the bleed duct 60, and extends at least partially around a perimeter of the turbine section 28 to allow for distribution of the bleed airflow 66 to multiple circumferential locations of the turbine section 28. In some embodiments, the turbine manifold 68 extends completely around the perimeter of the turbine section 28. The bleed airflow 66 flows from the turbine manifold 68 to cool one or more components of the turbine section 28, for example, one or more turbine airfoils 70. The bleed air cooling system 72 includes a modulating valve 74 to provide an increased or decreased flow of bleed airflow 66 to the turbine manifold 68. While in the embodiment of FIG. 2, a single bleed duct 60 is utilized, in other embodiments, such as illustrated in FIG. 3, multiple bleed ducts 60 are used, each with a separately controlled modulating valve 74.

Figure 4:
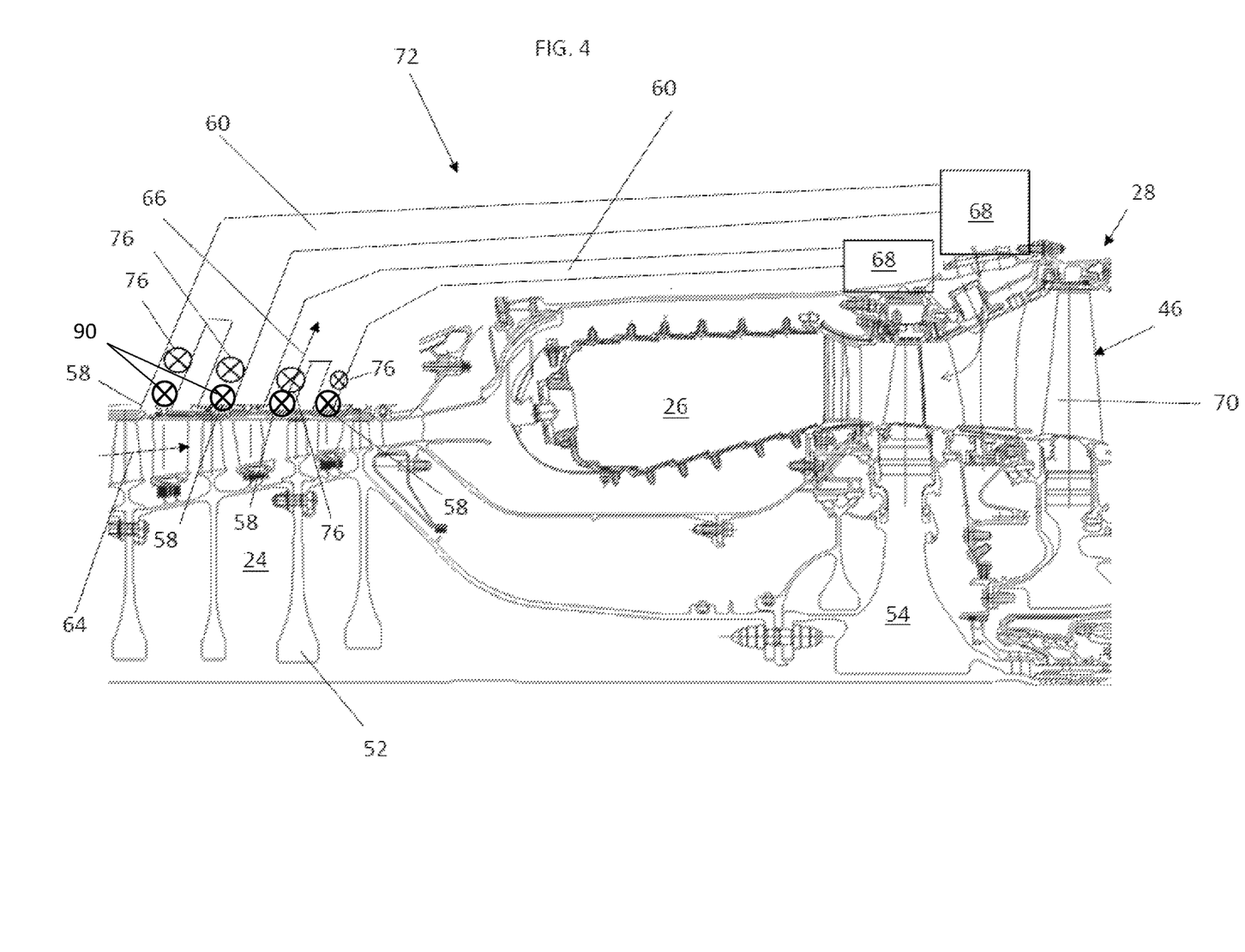
FIG. 4 is a schematic of yet another embodiment of a bleed system for a gas turbine engine.

Referring now to FIG. 4, in some embodiments multiple bleed ducts 60 feed a common turbine manifold 68 and control valves 76 are located in the bleed ducts 60 to allow for switching of a source for bleed airflow 66 among the different bleed ducts 60. While four bleed ducts 60 are illustrated in FIG. 4, one skilled in the art will readily appreciate that in other embodiments other numbers of bleed ducts 60, such as 3, 5 or 6 bleed ducts 60 may be utilized. In some embodiments, the control valves 76 are passively controlled, relying on, for example, a delta pressure across the control valve 76 to control its operation. In other embodiments operation of the control valves 76 is actively managed through the use of one or more operational sensors (not shown) along the bleed duct 60 and a controller (not shown) to determine operation of the control valves 76 based on the sensed information.

Figure 5:
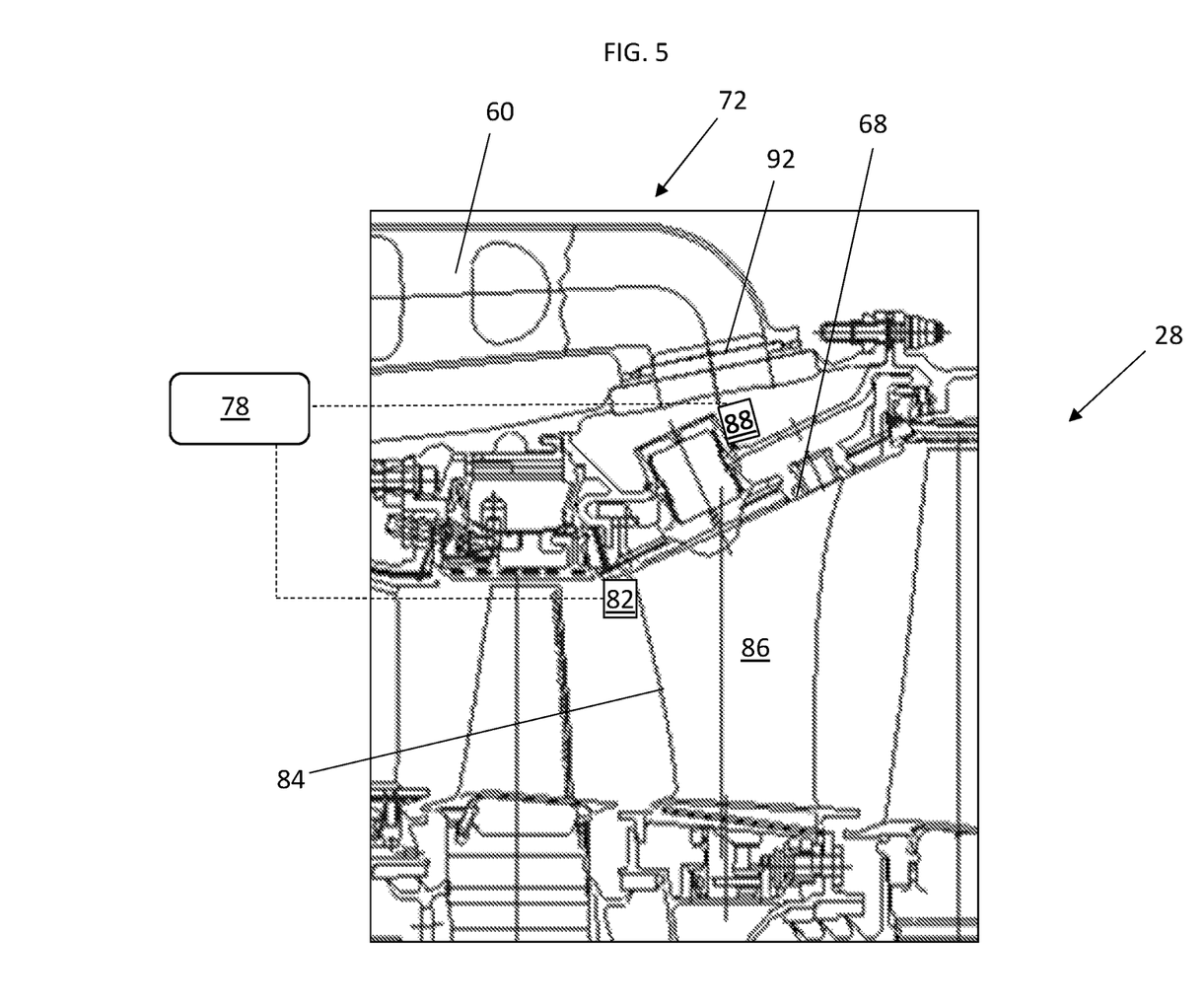
FIG. 5 is a schematic view of an embodiment of a safety system for a bleed system of a gas turbine engine.

Referring now to FIG. 5, safety sensors are utilized to determine pressures at discrete locations of the gas turbine engine 10. A gaspath pressure is sensed by a gaspath safety sensor 82 located in the turbine section 28 at, for example, a leading edge 84 of a turbine vane 86 to be cooled. Additionally, a manifold safety sensor 88 is located at the turbine manifold 68 and senses a manifold pressure. The controller, in some embodiments a full authority digital engine control (FADEC) 78 compares the gaspath pressure to the manifold pressure and calculates a backflow margin of the cooled component, for example, the turbine vane 86. When the calculated backflow margin is above a selected threshold, the FADEC 78 can determine whether the bleed airflow system 72 is operating within desired parameters.

The safety sensors 82, 88 provide information to the FADEC 78 in real time, so that the FADEC 78 can evaluate operation of the bleed airflow system 72 for errors or anomalies. Control rules for operational safety of the bleed airflow system 72 reside at the FADEC 78. Such anomalies may be indicative of a malfunctioning or failed operational sensors, and/or malfunctioning or failed system valves 74, 76, or leakage in the bleed duct 60 or other bleed airflow system 72 component problems. The FADEC 78 can then adjust operation of the bleed airflow system 72 based on the detected anomaly. For example, in the case of a malfunctioning operational pressure sensor, the bleed airflow 66 source may be switched to the highest pressure bleed port 58 having a temperature lower than a max use temperature of the bleed airflow system 72, thus ensuring that there is no backflow of air from the turbine section 28 to the compressor section 24. Further, any modulation of the bleed airflow 66 may be limited. As a further safety measure, one-way check valves 90 (shown in FIG. 4) may be located along the bleed ducts 60 to prevent backflow along the bleed ducts from the turbine section 28 to the compressor section 24, which would be detrimental to gas turbine engine 10 operation. In some embodiments, check valves 90 are located at or near the bleed ports 58. Safety sensors 82, 88 may be located upstream from or downstream of the control valves 76. Further safety sensors 82, 88 may be located upstream and/or downstream of the modulating valve 74.

In another example, in the case of a malfunctioning operational temperature sensor, the bleed airflow 66 source is switched to the bleed port 58 having the lowest temperature at which the airflow is of a pressure higher than a minimum required pressure of the bleed airflow system 72. This ensures cooling requirements are met with adequately low temperature bleed airflow 66. If both a malfunctioning operational pressure sensor and a malfunctioning operational temperature sensor are detected by the FADEC 78, the bleed airflow system 72 may be switched to operate in a selected operational mode, such as maximum takeoff operational mode.

In some embodiments, the bleed airflow system 72 may further include a venturi nozzle 92 to prevent significant overboard bleed airflow 66 in the case of a damaged bleed duct 60. Further, the control rules along with the safety sensors 82, 88 may be utilized to monitor health of the gas turbine engine 10 and react to anomalous situations by the FADEC 78 overriding the logic controlling the valve positions in the bleed airflow system 72 to a selected failsafe operational position depending on the anomaly or anomalies detected by the system.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bleed air cooling system for a gas turbine engine, comprising:
    two or more bleed ports disposed at different axial locations of the gas turbine engine to divert a bleed airflow from a gas turbine engine flowpath;
    one or more bleed outlets disposed at a cooling location of the gas turbine engine;
    a common bleed duct in fluid communication with the two or more bleed ports and configured to convey the bleed airflow from the two or more bleed ports to the one or more bleed outlets;
    a plurality of control valves, a control valve of the plurality of control valves disposed between each bleed port and each bleed outlet;
    a turbine manifold disposed between the common bleed duct and the one or more bleed outlets and configured to distribute the bleed airflow from the common bleed duct to the one or more bleed outlets, the turbine manifold extending at least partially around a circumference of the gas turbine engine; one or more safety sensors to sense operational characteristics of the gas turbine engine; a one-way check valve located along the common bleed duct to prevent backflow along the common bleed duct from the cooling location, the common bleed duct extending directly from the one-way valve to the turbine manifold; and a controller operably connected to the one or more safety sensors and configured to evaluate the sensed operational characteristics for one or more anomalies in operation of the bleed air cooling system, wherein the one or more safety sensors include: a gaspath safety sensor disposed and configured to measure a gas turbine engine flowpath pressure of the gas turbine engine flowpath at a component at the cooling location to be cooled by the bleed airflow; and a manifold safety sensor disposed at the turbine manifold and configured to measure a turbine manifold pressure, wherein the controller is configured to: determine a backflow margin of the cooled component based on the measured gas turbine engine flowpath pressure and the measured turbine manifold pressure; and modify operation of the bleed air cooling system if the backflow margin exceeds a selected threshold, wherein the component to be cooled is a turbine vane and the gaspath safety sensor is disposed at a leading edge of the turbine vane to be cooled, and wherein the controller is configured to selectably change a source of the bleed airflow if the backflow margin exceeds the selected threshold.

2. The bleed air cooling system of claim 1, wherein the controller is configured to selectably modulate the bleed airflow through the bleed air cooling system.

3. The bleed air cooling system of claim 1, wherein the one or more safety sensors further includes a temperature safety sensor.

4. The bleed air cooling system of claim 1, wherein the controller is a full authority digital engine control.

5. A gas turbine engine, comprising:
a compressor section;
a turbine section operably connected to the compressor section; and
a bleed air cooling system, comprising:
two or more bleed ports disposed at different axial locations of the gas turbine engine to divert a bleed airflow from a gas turbine engine flowpath; one or more bleed outlets disposed at a cooling location of the gas turbine engine;
a common bleed duct in fluid communication with the two or more bleed ports and configured to convey the bleed airflow from the two or more bleed ports to the one or more bleed outlets;
a plurality of control valves, a control valve of the plurality of control valves disposed between each bleed port and each bleed outlet;
a turbine manifold disposed between the common bleed duct and the one or more bleed outlets and configured to distribute the bleed airflow from the common bleed duct to the one or more bleed outlets, the turbine manifold extending at least partially around a circumference of the gas turbine engine;
one or more safety sensors to sense operational characteristics of the gas turbine engine;
a one-way check valve located along the common bleed duct to prevent backflow along the common bleed duct from the cooling location, the common bleed duct extending directly from the one-way valve to the turbine manifold; and a controller operably connected to the one or more safety sensors and configured to evaluate the sensed operational characteristics for one or more anomalies in operation of the bleed air cooling system, wherein the one or more safety sensors include:
a gaspath safety sensor disposed and configured to measure a gas turbine engine flowpath pressure of the gas turbine engine flowpath at a component at the cooling location to be cooled by the bleed airflow; and
a manifold safety sensor disposed the turbine manifold and configured to measure a turbine manifold pressure; wherein the controller is configured to: determine a backflow margin of the cooled component based on the measured gas turbine engine flowpath pressure and the measured turbine manifold pressure; and modify operation of the bleed air cooling system if the backflow margin exceeds a selected threshold, wherein the component to be cooled is a turbine vane and the gaspath safety sensor is disposed at a leading edge of the turbine vane to be cooled, and wherein the controller is configured to selectably change a source of the bleed airflow if the backflow margin exceeds the selected threshold.

6. The gas turbine engine of claim 5, wherein the controller is configured to selectably modulate the bleed airflow through the bleed air cooling system.

7. The gas turbine engine of claim 5, wherein the one or more safety sensors further includes a temperature safety sensor.

8. The gas turbine engine of claim 5, wherein the controller is a full authority digital engine control.

9. A method of operating a gas turbine engine, comprising:
conveying a bleed airflow from two or more bleed ports of the gas turbine engine toward a cooling location of the gas turbine engine along a common bleed duct in fluid communication with the two or more bleed ports to one or more bleed outlets to provide cooling to the cooling location;
operating a plurality of control valves, a control valve of the plurality of control valves disposed between each bleed port and each bleed outlet;
monitoring the bleed airflow for anomalies via one or more safety sensors located along a bleed airflow pathway, the one or more safety sensors including:
a gaspath safety sensor disposed and configured to measure a gas turbine engine flowpath pressure of the gas turbine engine flowpath at a component at the cooling location to be cooled by the bleed airflow; and
a manifold safety sensor disposed at a turbine manifold located between the two or more bleed ports and the cooling location, the manifold safety sensor configured to measure a turbine manifold pressure at the turbine manifold;
selectably modifying the bleed airflow in response to detection of one or more anomalies;
determining a backflow margin of the cooled component based on the measured gas turbine engine flowpath pressure and the measured turbine manifold pressure; and modifying operation of the bleed air cooling system if the backflow margin exceeds a selected threshold;

selectably changing a source of the bleed airflow if the backflow margin exceeds the selected threshold; and preventing backflow from the cooling location via a one-way check valve disposed in the common bleed duct, the common bleed duct extending directly from the one-way valve to the turbine manifold, wherein component to be cooled is a turbine vane and the gaspath safety sensor is disposed at a leading edge of the turbine vane to be cooled.

10. The method of claim 9, further comprising selectably modulating the bleed airflow through the bleed air cooling system.

* * * * *